US007213002B2

(12) United States Patent
Cohen

(10) Patent No.: US 7,213,002 B2
(45) Date of Patent: May 1, 2007

(54) METHOD AND SYSTEM FOR INVESTING WITH A NO-LOSS OR LOW-LOSS ASSURANCE

(76) Inventor: Herbert Cohen, 9619 Marathon Ter. #202, North Potomac, MD (US) 20878-7301

( * ) Notice: Subject to any disclaimer, the term of this patent is extended or adjusted under 35 U.S.C. 154(b) by 666 days.

(21) Appl. No.: 10/154,143

(22) Filed: May 22, 2002

(65) Prior Publication Data

US 2003/0220857 A1 Nov. 27, 2003

(51) Int. Cl.
*G06Q 40/00* (2006.01)
(52) U.S. Cl. .............. 705/38; 705/37; 705/4; 705/36; 705/35
(58) Field of Classification Search ........... 705/35–38, 705/4
See application file for complete search history.

(56) References Cited

U.S. PATENT DOCUMENTS

| 5,631,828 | A | * | 5/1997 | Hagan ............................ 705/4 |
| 5,784,696 | A | | 7/1998 | Melnikoff |
| 5,884,287 | A | * | 3/1999 | Edesess ........................ 705/36 |
| 5,974,390 | A | | 10/1999 | Ross |
| 5,991,743 | A | | 11/1999 | Irving et al. |
| 6,064,985 | A | * | 5/2000 | Anderson ..................... 705/36 |
| 6,078,904 | A | | 6/2000 | Rebane |
| 6,275,814 | B1 | | 8/2001 | Giansante et al. |
| 6,282,520 | B1 | | 8/2001 | Schirripa |
| 6,336,102 | B1 | * | 1/2002 | Luskin et al. ................. 705/35 |
| 6,360,210 | B1 | * | 3/2002 | Wallman ....................... 705/36 |
| 6,453,303 | B1 | * | 9/2002 | Li .................................. 705/36 |
| 6,470,321 | B1 | * | 10/2002 | Cumming et al. .............. 705/4 |
| 2002/0004776 | A1 | * | 1/2002 | Gladstone ..................... 705/37 |
| 2002/0103742 | A1 | * | 8/2002 | Billings et al. ............... 705/37 |
| 2003/0105652 | A1 | * | 6/2003 | Arena et al. .................... 705/4 |

OTHER PUBLICATIONS

James B. Smith, national underwriter life & health, Dec. 2, 1996, 49, p. 27, 28.*
Capital allocation for insurance companies (Journal of Riak and Insurance) Malvern: Dec. 2001, vol. 68, Iss. 4; p. 545, 36 pgs.*

* cited by examiner

*Primary Examiner*—Frantz Poinvil
*Assistant Examiner*—Clement Graham
(74) *Attorney, Agent, or Firm*—Notaro & Michalos P.C.

(57) ABSTRACT

The present invention is a method and system for investing with a no or low-loss assurance the aid of an agent. The invention provides a plurality of risk levels having a gain apportionment value and a lost apportionment value. The gain apportionment value dictates the apportionment of a gain between the investor and the agent, while the lost apportionment value dictates the apportionment of a loss between the investor and the agent. Each risk level also has a gain sale threshold and a loss sale threshold. The investor selects one of the risk levels. When one of the sale thresholds is reached, the equity is sold to complete a cycle or transaction of a combo, or combination of transactions. The investor's apportioned gain is added to an investor's money packet thereby increasing its value. A loss sale threshold ends the combo. The loss is apportioned between the investor and the agent according to the loss apportionment value of the selected risk level and the investors apportioned loss is subtracted from the money packet.

11 Claims, 1 Drawing Sheet

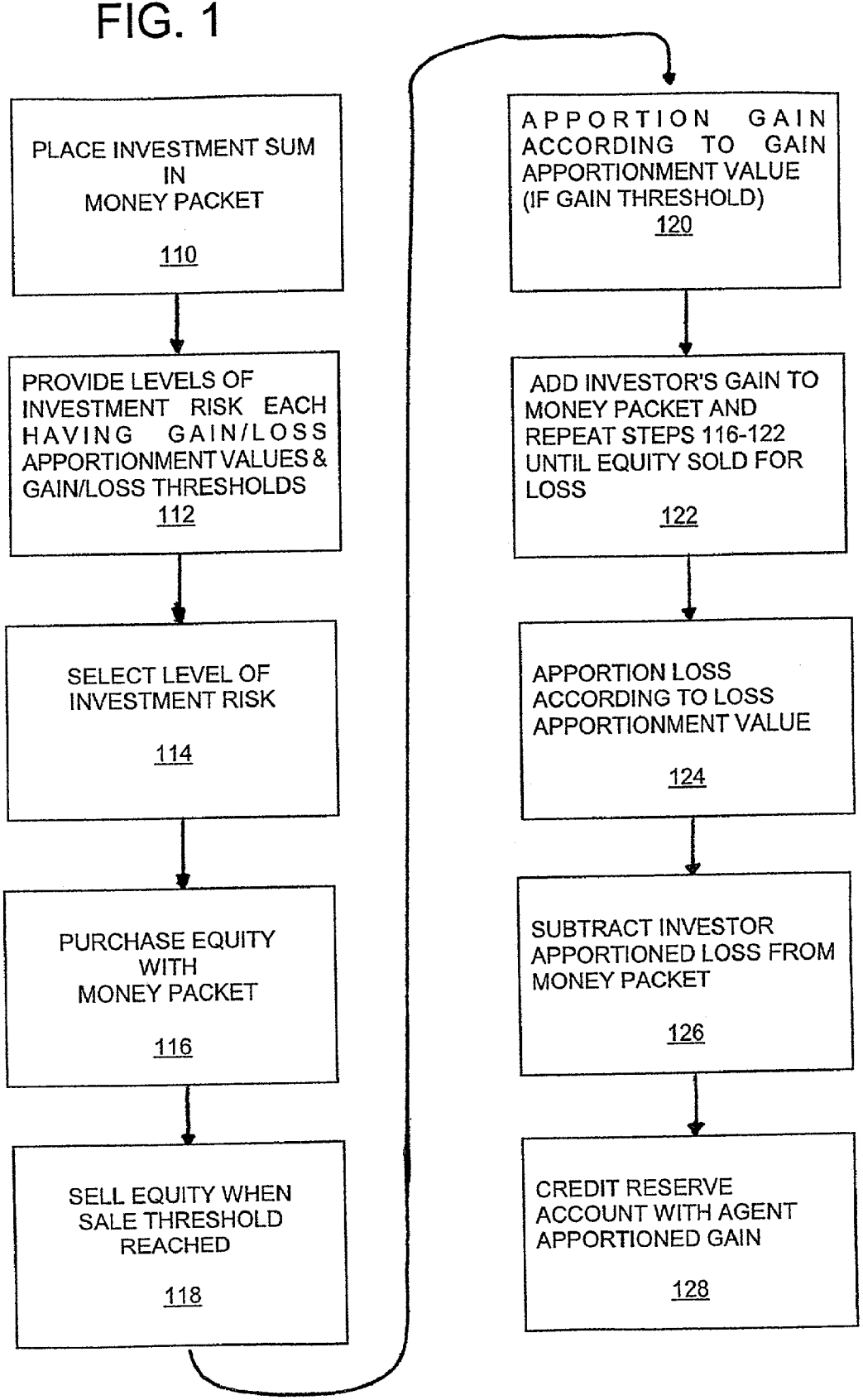

METHOD AND SYSTEM FOR INVESTING WITH A NO-LOSS OR LOW-LOSS ASSURANCE

FIELD AND BACKGROUND OF THE INVENTION

The present invention relates generally to investing, and, more particularly, to a method and system of investing which provides the investor with a no-loss or a low-loss assurance.

Traditionally, investing has been difficult for the typical investor, particularly when the investor wishes to invest in a number of different investments for purposes of diversification but has a limited amount of funds to invest. The problem is exacerbated by the fact that most investors have neither the understanding nor the resources to properly measure the risk and return of investments.

Considering investment in stocks as illustrative of the general problem posed above, the advent of stock mutual funds in recent years has made it substantially easier for the investor to achieve the goal of diversification on a limited budget. The fact that a fund manager assumes the responsibility, which would otherwise be the investor's, of researching and trading the stocks of individual companies has made investing in the stock market more convenient.

Nonetheless, individual investors, as well as institutional investors, still face the inherent risk relating to the possibility of a loss in invested capital.

SUMMARY OF THE INVENTION

It is an object of the present invention to provide a method and system of investing which protects the investor from a loss of invested capital.

It is also an object of the present invention to provide a method of investing which offers a no loss assurance to the investor.

Accordingly, the invention provides a method for an investor to invest an amount of money, here called a money packet, with the aid of an agent, and with a no or low-loss assurance, depending on one of a plurality of risk levels selected by the investor. Each risk level has a gain apportionment value and a loss apportionment value which dictate an apportionment of a gain and a loss, respectively, between the investor and the agent. Each risk level also includes a gain sale threshold and a loss sale threshold. A risk level is selected for investing the money packet. An equity is purchased with the money packet. Upon reaching one of the sale thresholds, the equity is sold to complete a cycle or transaction of a combo, or combination of transactions. If the sale threshold reached is a gain sale threshold, the gain is apportioned between the investor and the agent according to the gain apportionment value of the selected risk level. The investor's apportioned gain is added to the money packet thereby increasing its value. The method repeats the steps of purchasing an equity with the money packet, selling the equity when a sale threshold is reached and apportioning the gain between the investor and the agent according to the gain apportionment value, until the sale threshold is a loss sale threshold. A loss sale threshold ends the combo. The loss is apportioned between the investor and the agent according to the loss apportionment value of the selected risk level and the investor's apportioned loss is subtracted from the money packet.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a block diagram of the steps of the present invention.

DESCRIPTION OF THE PREFERRED EMBODIMENTS

In accordance with the present invention, an investor invests a sum of money into equities through an agent. The agent bears a portion or all of any realized loss in the invested sum, thus providing a safe, no-loss or low-loss assurance to the investor. An agent is any person or entity which transacts the sale and purchase of equities on behalf of the investor, such as a broker. The type of equities which an agent can purchase with the investment sum include, but certainly are not limited to, stocks, stock options, bonds, money market funds, real estate, mutual funds or any other equity that has recognized predictability in its potential for gain.

Referring to the drawings, FIG. 1 shows a process flow diagram of operation of an investment method with a selected loss assurance.

At step 110, an investment sum is provided to an agent for investing into equities. The investment sum, for example $10,000, is called a money packet and is placed into a money packet account. The money packet has an identification code that matches the money packet to the investor. The money packet is invested during a sequence of transactions that may yield any number of gains but only one last loss. Each sequence of such transactions is here called a combo. A combo is a combination of transactions which may be a single loss, or one or more gains in a series of transactions that ends with a loss. The loss transaction ends a prior combo and starts the next, new combo.

At step 112, the invention provides the investor with a plurality of levels of investment risk. Each level of investment risk has a pre-designated gain apportionment value and a pre-designated loss apportionment value. The apportionment values determine the apportionment of any gain or loss, respectively, between the investor and the agent realized from transactions using the money packet. Each level also has a gain threshold that dictates when the equity must be sold to realize a gain, and a loss threshold which likewise dictates when the equity must be sold to realize a loss.

For example, Level 1 has a gain apportionment value for the investor of 12% and a loss apportionment value for the investor of 0% (no-loss assurance). The agents gain apportionment value is 88% but his/her loss apportionment value is 100%. The gain threshold is 4% and the loss threshold is 2%.

If Level 1 is selected, the agent, using known research tools, will identify an equity, e.g. a stock, that is likely to gain over 4% in the short run, e.g., a stock that is expected to gain 6% within the next few weeks. All of the money in the packet is then used to purchase as much of the selected stock as needed to use up the packet. This starts the first transaction in a combo. If the stock rises by 4%, all of the stock is sold. Following the requirements of Level 1, 12% of this gain is credited to the investor and added to the packet for the next transaction. 88% of the gain is credited to the agent and removed from the packet. The packet is then used to purchase the same or a different equity. The only limitation is that the equity must be expected to make the 4% or better gain, at least in the short run. If, however, the stock price falls by 2%, all of the stock must be sold and the loss apportioned to the agent (100% loss to agent or no-loss assurance to investor). The agent must credit the loss to the packet thereby returning the packet to its prior value. The combo ends and a new combo begins with the next transaction.

Level 2 may have a gain threshold of 4.8 to 6%, for example, a loss threshold of 2%, an investor gain apportionment of 45% (agent gain apportionment 55%), and a loss apportionment (low-loss assurance) of 50%. Level 3 may correspond, for example, to the prior art in that an aggressive gain of over 10% is sought, with the gain and loss apportionments for the investor being 100% in both cases. If this level is selected the agent is paid a commission for the transactions and does not share either in any gain or in any loss. If any loss-assurance level is selected the agent receives no additional commission but rather shares in the gain.

Thus, depending on the level selected, the apportionment values determine the apportionment of any gain or loss, respectively, between the investor and the agent realized from transactions using the money packet. Each level also has the gain threshold that dictates when the equity must be sold to realize a gain, and the loss threshold which likewise dictates when the equity must be sold to realize a loss.

The investor selects the level of investment risk to be assigned to the money packet at step 114. The level of investment is selected based on the desired level of return and the risk aptitude of the investor. An investor who is willing to bear a high level of risk can select a level of investment which provides a larger apportionment of realized gain but also a larger apportionment of realized loss to the investor. An investor who is not willing to accept a high level of risk can select a level of investment which provides a smaller apportionment of any realized gain but a zero or a smaller apportionment of any realized loss to the investor.

Each level of investment also has the pre-designated gain sale threshold and pre-designated loss sale threshold. The pre-designated gain sale threshold corresponds to an increase in the value of a purchased equity or a profit which would be realized from a sale of the equity. The pre-designated loss sale threshold corresponds to a decrease in the value of the purchased equity. The sale thresholds initiate the sale of the equity. When the current market value of an equity purchased with the money packet reaches one of the sale thresholds, the agent must sell the equity.

The following is an exemplary table of the levels of investment and their respective predesignated apportionment values and sale thresholds.

| Level | Gain Threshold (%) | Loss Threshold (%) | Investor's Gain (%) | Investor's Loss (%) | Summary |
| --- | --- | --- | --- | --- | --- |
| 1 | 4 | 2 | 12 | 0 | no loss assurance, no commission |
| 2 | 6 | 2 | 45 | 50 | no commission |
| 3 | 10 | 2 | 100 | 100 | investor trades only, commissions paid |

Level 1 provides a no-loss assurance to the investor. 12% of any realized gain is apportioned to the investor, while the remaining 88% of the realized gain is apportioned to the agent. The investor, however, does not bear realized loss and pays no commission to the agent on any transactions using the money packet. Under Level 1, the agent must sell an equity purchased with the money packet if the equity's current market value is at least 4% higher or at least 2% lower than the purchase price of the equity. An investor who selects Level 1 will receive the lowest apportioned gain but will not bear any loss in the value of the money packet.

Level 2 provides a riskier investment style. The investor will receive 45% of any realized gain (higher than in Level 1) but will also bear 50% of any loss. A Level 2 investor will not pay a commission to the agent on any transaction using the money packet. It is likely that the type of equities purchased under Level 2 will be riskier than the type of investments purchased under Level 1 since the Level 2 has a higher gain threshold—6%. Thus, the agent must wait until the equity's current market value is at least 6% higher than the purchase price of the equity to sell the equity.

Level 3 provides the traditional investment arrangement to investors as known in the prior art. The investor receives 100% of any realized gain, bears 100% of any realized loss and pays a commission to the agent on any transaction using the money packet.

At step 116, the agent purchases an equity with the money packet on behalf of the investor. As is well known in the prior art, the agent conducts an analysis to determine which equity corresponds to the selected level of investment or which will have a projected value that correspond to the gain sale threshold. For example, with respect to stocks, the agent researches the cyclical patterns of a stock's price. A stock that meets the profit criteria of the selected level is considered for a purchase.

At step 118, the equity is sold when one of the sale thresholds is reached. The sale completes the first cycle or transaction of the combo.

If the sale threshold reached is a gain sale threshold, the gain is apportioned between the investor and the agent according to the gain apportionment value of the selected level of investment at step 120.

The investor's apportioned gain is added to the money packet at step 122.

Steps 116, 118, 120, and 122 are repeated until the equity is sold for a loss, which means that the loss sale threshold has been reached. The equity purchased at step 116 can be the same or different from a prior purchased equity. The money packet used to purchase the equity includes the original investment sum and any apportioned investor's gain added thereto from a prior sale in the combo.

At step 124, the loss is apportioned between the investor and the agent according to the loss apportionment value.

The investor's apportioned loss is subtracted from the money packet at step 126.

At step 128, the gain apportioned to the agent is credited to a reserve account of the agent.

A loss ends the combo. Once a combo ends due to a loss, the method provides an accounting and distribution of funds. The method uses data processing in an arithmetic logic circuit configuration to calculate the net gains or losses to the investor and the agent.

In a second embodiment, the investment sum is divided into a plurality of money packets. A different level of investment can be selected for each money packet. This provides the investor the possibility of choosing different levels of risk for each money packet.

The investment system of the present invention utilizes a server, an investor terminal and an agent terminal. The server and agent terminal can be coupled using multiple access methods, including a local or wide area network, Intranet, Internet, leased communication lines or dial-up telephone lines, or some combination thereof. The investor terminal is not necessarily hard-wired to the server. The server can be accessed by the investor through the Internet, leased communication lines or dial-up telephone lines, or some combination thereof.

Server

A server includes a database and a data processor operating under control of an operating system and application software. The server responds to messages from the agent terminal and the investor terminal. The data processor may comprise a microprocessor, for example, an Intel Pentium processor, a mini-computer or mainframe processor.

The server accepts investor information from the investor and agent terminals, compares the sale gain threshold with projected values of equities, and sends information based on the comparison to the sender terminal.

The database stores and segregates levels of investment profiles, and for each level of investment profile, a gain apportionment value, a loss apportionment value, a gain sale threshold and a loss sale threshold.

The gain apportionment value, a loss apportionment value, gain sale threshold, and loss sale threshold have been pre-designated and selected by the agent for each level of investment. The number of apportionment values and sale thresholds which can be used by the system are virtually limitless.

The server, in a preferred embodiment of the invention, includes a set of program modules. Each module is a set of software objects and/or program elements, collectively having the ability to execute independently in a separate thread or logical chain of process execution. Each module can be executed as a separate logical server or using a separate physical device.

The server preferably includes a login module, an investor module and an agent module. The login module is responsible for password checking, access control, and assignment of a particular program module to service the investor.

The investor module handles all server-side application requirements of the investor terminal. The agent module handles all server-side application requirements of the agent terminal.

Investor Terminal

The investor terminal comprises a device or set of devices coupled to the server, such as a general purpose processor operating under control of operating system and application software, and disposed to enter and process information, as described herein. In a preferred embodiment, the investor terminal can comprise a PC workstation such as an Intel Pentium processor operating under control of the Microsoft Windows operating system.

The investor terminal includes information input devices, such as a keyboard and mouse or other pointing device, and information output and presentation devices, such as a monitor and printer.

An investor uses the investor terminal to access from the server the level of investment profiles, to select a level of investment profile, and to monitor transactions and the balance in the investor's account.

The investor cannot access the server without entering an authorized code or password.

Agent Terminal

The agent terminal comprises a device or set of devices coupled to the server terminal, such as a general purpose processor operating under control of operating system and application software. In a further preferred embodiment, the agent terminal can comprise a PC workstation such as an Intel Pentium processor operating under control of the Microsoft Windows operating system.

The agent terminal includes information input devices, such as a keyboard and mouse or other pointing device, and information output and presentation devices, such as a monitor and printer.

A agent uses the agent terminal to transmit level of investment profiles and instructions to sell a purchased equity to the server terminal, and to access an investor's selection of a level of investment and account balance information.

While a specific embodiment of the invention has been shown and described in detail to illustrate the application of the principles of the invention, it will be understood that the invention may be embodied otherwise without departing from such principles.

What is claimed is:

1. A computer-based method for an individual investor to invest a money packet, with the aid of an agent, and with a controlled loss assurance, by utilizing a computer system having a terminal coupled to a database having a plurality of risk level profiles, each risk level profile having a gain apportionment value which dictates apportionment of a gain between the individual investor and the agent, at least one of the risk level profiles having a non-zero apportionment of loss to the agent, each risk level profile having a gain sale threshold and a loss sale threshold, the method comprising the steps of:

a. selecting one of said risk level profiles having a non-zero apportionment of loss to the agent at the terminal, each risk level profile having a gain sale threshold and a loss sale threshold;
   b. purchasing an equity with the money packet at the terminal;
   c. upon reaching one of the sale thresholds, selling all of the purchased equity to complete a cycle of a combo;
   d. If the sale threshold reached is a gain sale threshold, apportioning the gain between the individual investor and the agent according to the gain apportionment value of the selected risk level profile; adding the individual investor's apportioned gain to the money packet; and repeating steps b. to d. until the sale threshold is a loss sale threshold, wherein the loss sale threshold ends the combo;
   e. apportioning the loss between the Individual Investor and the agent according to the loss apportionment value of the selected risk level profile;
   f. subtracting the individual investor's apportioned loss from the money packet; and
   g. distributing moneys in the money packet to individual investors.

2. The computer-based method according to claim 1, wherein the equity has a projected value corresponding to the gain sale threshold of the selected risk level profile.

3. The computer-based method according to claim 1, wherein the risk level profile comprise a low risk level profile, a medium risk level profile and a high risk level profile.

4. The computer-based method according to claim 3, wherein for the low risk level profile, no loss is apportioned to the individual investor.

5. The computer-based method according to claim 3, wherein for the high risk level profile, 100 percent of the gain and 100 percent of the loss are apportioned to the individual investor.

6. The computer-based method according to claim 1, further comprising a step of providing a commission value credited to the agent for any sale of the equity if the gain apportionment value for the selected risk level profile corresponds to 100 percent of the gain apportioned to the individual investor.

7. The computer-based method according to claim 1, further comprising a step of computing a net value from all of the gains and the loss of the combo.

8. The computer-based method according to claim 1, further comprising a step of crediting a reserve account with the gain apportioned to the agent.

9. A computer system for investing a money packet, with the aid of an agent, and with a controlled loss assurance, the computer system comprising:
   a computer server having a database;
   a plurality of risk level profiles stored in the database, the risk level profiles including a gain apportionment value which dictates apportionment of a gain between an individual investor and the agent, and a loss apportionment value which dictates apportionment of a loss between the individual investor and the agent, at least one of the risk level profiles having a non-zero apportionment of loss to the agent, the risk level profiles further including a gain sale threshold and a loss sale threshold;
   access means for retrieving the plurality of risk level profiles on an investor terminal connected to the computer server;
   selection means for choosing one of the risk level profiles having a non-Zero apportionment of loss to the agent;
   purchase means for purchasing an equity with the money packet;
   selling means for selling all of the purchased equity when one of the sale thresholds is reached to complete a cycle of a combo;
   apportioning means for apportioning any gain between the Individual investor and the agent according to the gain apportionment value of the selected risk level, and for apportioning any loss between the individual investor and the agent according to the loss apportionment value of the selected risk level to end the combo; and
   distributing moneys in the money packet to individual investors.

10. A computer system as claimed in claim 9, further comprising a computing means for computing a net value from all of the gains and the loss of the combo.

11. A computer system for investing a money packet, with the aid of an agent, and with a controlled loss assurance, the computer system having a database of a plurality of risk level profiles, the risk level profiles including a gain apportionment value which dictates apportionment of a gain between an individual investor and the agent, and a loss apportionment value which dictates apportionment of a loss between the individual investor and the agent, at least one of the risk level profiles having a non-zero apportionment of loss to the agent, the risk level profiles further including a gain sale threshold and a loss sale threshold; the computer system allowing an investor terminal to access the database for selecting one of the plurality of risk levels; the computer system receiving the selection of the risk level; the computer system receiving a selection of an equity; the computer system purchasing the selected equity with the money packet; the computer system selling all of the selected equity when one of the sale thresholds is reached to complete a first cycle of a combo; when the sale threshold is a gain sale threshold, the computer system apportioning a gain between the individual investor and the agent according to the gain apportionment value, and repeating the receipt of the selection of an equity, and the purchasing and the selling of the selected equity; when the sale threshold is a loss threshold, the computer system apportioning a loss between the individual investor and the agent according to the loss apportionment value, and the computer system ending the combo and distributing moneys in the money packet to individual investors.

* * * * *